United States Patent Office 3,592,760
Patented July 13, 1971

3,592,760
CATALYTIC HYDROCRACKING
Dean Arthur Young, Yorba Linda, Calif., assignor to
Union Oil Company of California, Los Angeles, Calif.
No Drawing. Filed Sept. 20, 1967, Ser. No. 669,289
Int. Cl. B01j 11/40; C10g 11/02
U.S. Cl. 208—111   27 Claims

ABSTRACT OF THE DISCLOSURE

A hydrocracking catalyst comprising a crystalline zeolite containing titanium or a compound thereof and a hydrogenation component such as a Group V, VI or VIII metal, oxide or sulfide and the use of such catalyst in a hydrocracking process.

This invention relates to an improved hydrocracking catalyst and to a hydrocracking process employing the catalyst. Metals of Groups V, VI and VIII, in elemental form or in the form of their oxides or sulfides, have previously been employed as hydrogenation components on bases such as alumina and silica-alumina for hydrocracking operations. More recently, crystalline zeolites have been employed as the base material for hydrocracking catalysts. While these catalysts have proved fairly satisfactory, improved performance, particularly with respect to ability to give a high yield of useful product, is much to be desired.

In accordance with the present invention it has been discovered that a crystalline zeolite-hydrogenation component catalyst having substantially improved activity with respect to hydrocracking, hydrotreating, hydrogenation and denitrogenation may be prepared by incorporating titanium in said catalyst. Although the mechanism involved in the promotional effect of the titanium is not known with certainty, it is believed to be related to one or all of the following phenomena: (1) adsorbing and dispersing the hydrogenation component, (2) promoting the intrinsic activity of the hydrogenation component or (3) acting as co-catalyst.

Titanium may be incorportaed into the zeolite by means of conventional processes including (1) impregnation with a solution of titanium salt in water or in an organic solvent, followed by drying and thermal decomposition of the metal compound and (2) vapor phase adsorption in which the zeolite is treated with a volatile halide of titanium, followed by reduction of the halide with a reducing agent or by hydrolytic decomposition of the halide. Titanium can also be added to the zeolite by impregnation with an ammoniacal solution of the peroxide.

Nonhydrolyzed titanium salts, e.g., those in vapor form or in solution in an organic solvent, adsorb by reacting with hydroxyl groups in the zeolite and releasing hydrogen chloride gas. If the zeolite is decomposed by acids the hydrogen chloride gas should be expelled by purging with a stream of dry air before the zeolite is allowed to become hydrated. Ammonia gas can also be used to protect acid sensitive zeolites after adsorption or impregnation.

When aqueous solutions of titanium salts are used they are advantageously added to a zeolite slurry. These salts, such as titanium tetrachloride, nearly completely hydrolyze in water to form dispersed titanic acid and hydrochloric acid. The soluble titanic acid is metastable and gradually polymerizes to form a non-dispersed insoluble titania. Thus these solutions must be freshly prepared, and a suitable base or buffer must be used to protect acid sensitive zeolites. For example, ammonium molybdate can be added to a zeolite slurry to neutralize the hydrochloric acid formed by titanium tetrachloride. Other suitable buffers include the hydroxides and carbonates of ammonia, alkali and alkaline earth elements, and various other elements such as zinc, manganese, iron, cobalt, and nickel. The alkaline salts of weak acids can also be used to counteract excessive acidity. Examples of such salts are ammonium vanadate, chromate, molybdate, tungstate, sulfide and borate. The neutralizing or buffering agent can be added to the zeolite slurry concurrently with or in alternate increments with the acidic titanium solution. The two components may also be combined by a suitable device such as a mixing nozzle immediately prior to addition to the zeolite. However, a fully condensed titania gel should be avoided because it does not act as an effective catalytic promoter. Suitable titanium salts other than the tetrachloride include the oxychloride, fluoride, bromide, sulfate, and oxalate. Exchanged forms of the zeolite should be prepared after the titanium addition to avoid displacing the stabilizing or catalytic cations from the zeolite.

Acid sensitive zeolites can be protected by using neutral or alkaline solutions of titanium. For example, the zeolite can be slurried in a solution of ammonium peroxotitanate or ammonium sulfato peroxotitanate. Then the slurry is heated or a reducing agent added to decompose the titanium compounds.

The crystalline zeolites are conventional and include the natural and synthetic forms of chabazite, erionite and mordenite. They also include synthetic zeolites such as types A, W, T, X and Y, which are described in U.S. Pats. 2,882,243, 3,216,789, 2,950,952, 2,882,244 and 3,130,007. These crystalline zeolites are metal aluminosilicates having a crystalline structure such that a relatively large absorption area is present inside each crystal. Access to this area may be had by way of openings or pores in the crystal. They consist basically of three-dimensional frameworks of $SiO_4$ and $AlO_4$ tetrahedra with the tetrahedra cross-linked by the sharing of oxygen atoms. The electrovalence of the tetrachedra containing aluminum is balanced by the inclusion in the crystal of cations, for example, metal ions, ammonium ions, amine complexes, or hydrogen ions. The spaces in the pores may be occupied by water or other adsorbate molecules.

The zeolites may be activated by driving off substantially all of the water of hydration. The space remaining in the crystals after activation is available for adsorption of reactant molecules. Any of this space not occupied by elemental metal is available for adsorption of molecules having a size, shape, and energy which permits entry of the adsorbate molecules into the pores of the zeolites.

The promotional effect of titanium has been found to be particularly effective when the zeolite is in the hydrogen, decationized, or polyvalent cation form; i.e., a zeolite in which the original alkali metal cations have been largely replaced. The hydrogen and decationized forms can be prepared by exchanging with an ammonium salt and subsequently heating to expel or oxidize ammonia.

The hydrogenation component may be incorporated into the zeolite by conventional procedures including (1) cation exchange using an aqueous solution of a metal salt wherein the metal itself forms the cation, (2) cation exchange using an aqueous solution of a metal compound in which the metal is in the form of a complex cation with coordination complexing agents such as ammonia, followed by thermal decomposition of the cationic complex, (3) impregnation with a solution of a suitable metal salt in water or in an organic solvent, followed by drying and thermal decomposition of the metal compound.

The hydrogenation component is also conventional and includes metals, oxides or sulfides of Groups V, VI and VIII of the Periodic Table. Specific examples include vanadium, chromium, molybdenum, tungsten, iron, cobalt, nickel, platinum, palladium and rhodium or any combination of these metals or their oxides or sulfides. Amounts of the hydrogenation component will usually range from about 0.1% to 25% by weight of the final composition, based on free metal. Generally, optimum proportions will range from about 0.5% to 10%.

Hydrogenation components from Groups VIII can be incorporated into the zeolite by impregnation or cation exchange. Iron, cobalt, or nickel can be exchanged from solutions of their salts. Ammonia or amine complexes of these elements may be used for exchanging in neutral or alkaline solutions. The latter method is particularly useful for adding palladium and platinum. Platinum group metals are normally added only as hydrogenation components and are usually employed in amounts of about 0.1 to 3.0 wt. percent. Other Group VIII elements can serve as both hydrogenation components and stabilizing cations to prevent hydrothermal degradation of the zeolite. They are usually employed in amounts of about 1.0 to 10 wt. percent.

Other hydrogenation components from Groups V-B and VI-B cannot be used as stabilizing cations and are added to the zeolite by impregnation, adsorption, or mixing powders or slurries. These elements are particularly active as oxides and sulfides. The optimum amount is usually within the range from 5 to 25 wt. percent, based on the free metal.

Molybdenum in the form of the sulfide is especially preferred as the hydrogenation component, preferably in combination with nickel or cobalt oxide which serve to stabilize the crystalline structure of the zeolite at the temperature of the hydrocracking operation. Molybdenum may be incorporated into the zeolite by the addition of ammonium molybdate, molybdic acid, molybdic oxide or sulfide. Suitable methods of combination include mixing as an aqueous slurry, kneading in the form of a paste, or mulling as a dry powder. Cationic forms of the zeolite, such as the hydrogen, nickel, cobalt, manganese, or iron forms of zeolites X, Y or L, can be calcined or steamed at 800 to 1600° F. to fix the cationic form and stabilize the structure prior to combining with the titanium and Group VI component. The molybdenum is conveniently incorporated into the zeolite by addition of ammonium molybdate solution to the zeolite, which may be in the form of an aqueous slurry. Subsequent calcination converts the molybdenum to the oxide.

The titanium is most conveniently incorporated in the zeolite by adsorption from an aqueous solution of a titanium salt, as discussed above. Suitable proportions of titanium range from about 1% to 20% by weight of the final composition, with a range of 2% to 5% generally being preferred. The titanium may be incorporated in the zeolite before, after, or simultaneously with the hydrogenation component. Incorporation of the titanium prior to, or simultaneously with, the addition of the hydrogenation component is, however, preferred, as discussed below.

The stabilizing component, i.e., nickel or cobalt, is also readily incorporated into the zeolite by adsorption from an aqueous solution of a salt of the metal, followed by calcination to the oxide. It may also be incorporated before, after or simultaneously with addition of the titanium and the hydrogenation component. Proportions of the nickel or cobalt will range from about 1% to 15% by weight, with the preferred range being from 4% to 8%.

The pH employed in incorporation of the metal components into the zeolite will generally range from about 3.0 to 9.0; however, optimum values will vary considerably depending on the type of zeolite and the specific metal compounds employed.

Following incorporation of the metal constituents into the zeolite and the specific metals and metal compounds employed.

Following incorporation of the metal constituents into the zeolite the composite is pelleted or otherwise treated to obtain catalyst particles of the size and shape desired for the reaction to be catalyzed. For hydrocracking processes, pellets of the type described in the examples below are generally suitable. A binder or matrix material is desirably incorporated in, or admixed with, the metal-zeolite composite prior to pelleting in order to increase the resistance of the final catalyst particles to crushing and abrasion. Silica, introduced in the form of a sol, is very satisfactory for this purpose; however, other oxides such as alumina or mixed oxides such as silica-alumina, silica-magnesia, etc. may also be used. These materials are also conventional and are described, e.g., in British Pat. No. 1,056,301.

The catalyst pellets are then dried and activated by calcining in an atmosphere that does not adversely affect the catalyst, such as air, nitrogen, hydrogen, helium, etc. Generally, the dried material is heated in a stream of dry air at a temperature of from about 500° F. to 1500° F., preferably about 900° F., for a period of from about 1 to 24 hours, preferably about 16 hours, thereby converting the metal constituents to oxides.

In addition, the catalysts are preferably further activated by presulfiding with a sulfide such as hydrogen sulfide or carbon disulfide to convert the metal constituents of the catalyst to sulfides. This is readily accomplished, e.g., by saturating the catalyst pellets with hydrogen sulfide for a period of from about 30 minutes to 2 hours.

It has also been found that addition of titanium to the crystalline zeolites provides increased adsorptive capacity for molybdenum. Accordingly, it will generally be advantageous to incorporate the titanium in the zeolite prior to or simultaneously with incorporation of the molybdenum.

The hydrocracking feedstocks that may be treated using the catalyst of the invention include in general any mineral oil fraction boiling above the conventional gasoline range, i.e., above about 300° F. and usually above about 400° F., and having an end-boiling-point of up to about 1200° F. This includes straight-run gas oils and heavy naphthas, coker distillate gas oils and heavy naphthas, reduced crude oils, cycle oil derived from catalytic or thermal cracking operations and the like. These fractions may be derived from petroleum crude oils, shale oils, tar sand oils, coal hydrogenation products and the like. Specifically, it is preferred to employ API gravity of 20 to 35°, and containing at least about 30% by volume of acid-soluble components (aromatics+olefins).

The process of this invention may be carried out in any equipment suitable for catalytic operations. It may be operated batchwise or continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed. After hydrocracking, the resulting products may be separated from the remaining components by conventional means such as adsorption or distillation. Also, the catalyst after use over an extended period of time may be regenerated in accordance with conventional procedures by burning off carbonaceous deposits from the surface of the catalyst in an oxygen-containing atmosphere under conditions of elevated temperature.

While the foregoing description has centered mainly upon hydrocracking processes, the catalysts described are also useful in a great variety of other chemical conversions, and generally, in any catalytic process requiring a hydrogenating and/or acid function in the catalyst. Examples of other reactions contemplated are hydrogenation, alkylation (of isoparaffins with olefins, or of aromatics with olefins, alcohols or alkyl halides), isomerization, polymerization, reforming (hydroforming), desulfurization, denitrogenation, carbonylation, hydrodealkylation, hydration of olefins, transalkylation, and the like.

The following examples will serve to more particularly illustrate the preparation of the catalysts of the invention and their advantageous properties in hydrocracking operations. Examples 1 through 7 illustrate the preparation of nickel-molybdena-zeolite Y catalysts with and without titanium. These catalysts were all prepared from similar batches of ammonium zeolite Y which contained 1.4–1.6% $Na_2O$. Titanium and molybdenum were added to the zeolite prior to forming catalyst pellets. The catalysts were formed into 0.094 x 0.020-inch wafer pellets by spreading a wet paste on a perforated stainless steel plate. The paste was prepared by mixing the zeolite with "Ludox LS" 30% silica sol and 1.7 M nickel nitrate solution in proportions to add 27% $SiO_2$ and 2.7% NiO to the finished catalyst. The silica served as a binder for the zeolite catalyst while the nickel acted as a coagulant for the sol and a stabilizer for the zeolite. All the catalysts were activated by heating and calcining for 16 hours at 900° F. in a stream of dry flowing air. The calcined catalysts were then presulfided by saturating with hydrogen sulfide at room temperature.

EXAMPLE 1

The sodium content of zeolite Y was decreased to 1.4% $Na_2O$ by exchanging with ammonium nitrate. A slurry was prepared by mixing 100 g. of the ammonium zeolite with 350 ml. water. Then 400 ml. of freshly prepared M/5 $TiCl_4$ was added concurrently with 175 ml. 1.0 M $(NH_4)_2 MoO_4$ and 2.0 N $NH_4OH$ with the proportions adjusted to maintain the pH at 3.5–4.0. The mixture was stirred two hours, filtered, and reslurried in 500 ml. water. Nickel was added as 25 ml. of 1.7 M $Ni(NO_3)_2$. The pH was adjusted to 4.5–4.9 with $NH_4OH$ prior to stirring for 30 minutes. The slurry was filtered, mixed with 120 ml. "Ludox LS" and 34 ml. 1.7 M $Ni(NO_3)_2$, formed into pellets and calcined. Analysis of the calcined pellets indicated 5.6% $TiO_2$, 8.9% $MoO_3$, and 5.5% NiO.

EXAMPLE 2

A molybdic acid solution was prepared by dissolving 20.7 g. $(NH_4)_6 Mo_7O_{24}.4 H_2O$ in 100 ml. water and adding sufficient 15 N $HNO_3$ to lower the pH to 4.0. The above solution was mixed with 100 g. of the previously described ammonium zeolite Y. This slurry was warmed on a steam bath until sufficient water evaporated to form a thin paste. The concentrated slurry was mixed with 27 ml. 1.7 M $Ni(NO_3)_2$ and then dried to a damp cake. The cake was stirred into 113 ml. of "Ludox LS" silica sol, mixed with 32 ml. 1.7 M $Ni(NO_3)_2$, formed into pellets and calcined. Analysis of the calcined pellets indicated 5.7% NiO and 11.0% $MoO_3$.

EXAMPLE 3

A slurry of 104 g. ammonium zeolite Y in 100 ml. water was adjusted to pH 4.0 with 3 N $HNO_3$. Eighty-nine ml. of 1.0 molar ammonium molybdate solution was added to the slurry. Sufficient nitric acid was added to maintain pH 4.0–4.5. Nickel was added to the slurry as 40 ml. of 1.7 M $Ni(NO_3)_2$. The mixture stood overnight prior to filtering. The filter cake was mixed with 93 ml. "Ludox LS" and 26 ml. 1.7 M $Ni(NO_3)_2$. The paste was formed into pellets and calcined. Analysis of the calcined pellets indicated 3.1% NiO and 9.2% $MoO_3$.

EXAMPLE 4

Ammonium zeolite Y, 100 g., was slurried with 40 ml. water and 63 ml. $(NH_4)_2MoO_4$ solution containing 0.10 g. $MoO_3$/ml. Concentrated ammonium hydroxide was added to increase the pH to 8.5. The slurry was aged overnight, then the water was evaporated while the mixture was agitated on a steam bath. The dried granules were mixed with 85 ml. "Ludox LS" and 24 ml. 1.7 M $Ni(NO_3)_2$. Then the paste was formed into pellets and calcined. Analysis of the calcined pellets indicated 5.1% $MoO_3$ and 2.9% NiO.

EXAMPLE 5

Ammonium zeolite Y, 100 g., was slurried in 40 ml. water and 63 ml. $(NH_4)_2MoO_4$ solution containing 0.10 g. $MoO_3$/ml. Sufficient glacial acetic acid was added to lower the pH to 3.5. The slurry was aged overnight. Then the solids were collected by filtration. The filter cake was mixed with 85 ml. "Ludox LS" and 24 ml. 1.7 M $Ni(NO_3)_2$. Then the paste was formed into pellets and calcined. Analysis of the calcined pellets indicated 4.6% $MoO_3$ and 2.6% NiO.

EXAMPLE 6

Ammonium zeolite Y, 100 g., was slurried in 300 ml. water. Titanium was added to the slurry as 44 ml. of freshly prepared 1.0 M $TiCl_4$. Sufficient ammonium hydroxide was added concurrently to maintain a pH of 3.5–4.0. The slurry was filtered and the filter cake was mixed with 63 ml. $(NH_4)_2MoO_4$ solution containing 0.10 g. $MoO_3$/ml. The pH was then adjusted to 8.5 with concentrated $NH_4OH$. After aging overnight the water was evaporated while agitating on a steam bath. The resulting granules were mixed with 89 ml. "Ludox LS" and 24 ml. 1.7 M $Ni(NO_3)_2$. The resulting paste was formed into pellets and calcined. Analysis of the calcined pellets indicated 2.1% $TiO_2$, 4.3% $MoO_3$, and 2.5% NiO.

EXAMPLE 7

Ammonium zeolite Y, 100 g., was slurried in 300 ml. water Titanium was added to the slurry as 44 ml. of freshly prepared 1.0 M $TiCl_4$. Sufficient ammonium hydroxide was added concurrently to maintain the pH at 3.5–4.0. The slurry was filtered and the filter cake was mixed with 63 ml. $(NH_4)_2MoO_4$ solution containing 0.10 g. $MoO_3$/ml. The pH was then adjusted to 3.5 with glacial acetic acid. The slurry was aged overnight and the solids were collected by filtration. The filter cake was mixed with 89 ml. "Ludox LS" and 24 ml. 1.7 M $Ni(NO_3)_2$. Then the paste was formed into pellets and calcined. Analysis of the calcined pellets indicated 2.1% $TiO_2$, 4.3% $MoO_3$, and 2.7% NiO.

These catalysts were tested in a hydrocracking conversion process in which a straight run gas oil having the properties shown in Table I was hydrocracked utilizing the following conditions: temperature, 800° F.; pressure, 1400 p.s.i.g.; liquid hourly space velocity, 2.0 and hydrogen circulation ratio, 12,000 standard cubic feet per barrel of charge. The product collected during 27–36 hours on stream was analyzed for nitrogen and distilled to determine the conversion to material boiling under 455° F. and the yield of 120–360° gasoline. Aromatics, olefins and saturates in the gasoline were determined by FIA adsorption analysis. Results are given in Table II.

Comparing the products of Examples 1 and 2 shows that titanium appreciably increased the denitrogenation and hydrocracking conversion. The former catalyst was more active although it contained less molybdena.

Comparing the product of Example 7 with that of Example 3 shows that the combination of 2.1% $TiO_2$ and 4.3% $MoO_3$ gave about the same activity as 9.2% $MoO_3$ without titania.

The four preparations in Examples 4–7 show that titanium has an appreciable promotional effect regardless of the method of adding the molybdenum. In Examples 6 and 7 titanium was added by adding titanium tetrachloride and ammonium hydroxide solutions to the ammonium zeolite Y slurries. The resulting combinations were collected by filtration to eliminate the ammonium chloride. Molybdenum was added in Examples 4 and 6 by slurrying with ammonium molybdate and evaporating the water. The method used in Examples 5 and 7 consisted of precipitating molybdic acid in the zeolite slurries and collecting the combined solids by filtration. Both comparisons show that adding 2.1% $TiO_2$ substantially increased hydrocracking, denitrogenation and the hydrogenation of olefins.

TABLE I

| | |
|---|---|
| Gravity (°API) | 24.9 |
| Total nitrogen (p.p.m.) | 2330 |
| Basic nitrogen (p.p.m.) | 843 |
| Sulfur (wt. percent) | 1.05 |
| D-1160 Engler (°F.): | |
| IBP | 455 |
| 10% | 605 |
| 30% | 670 |
| 50% | 715 |
| 70% | 765 |
| 90% | 835 |
| Max | 890 |

TABLE II

| Example | 1 | 2 | 3 | 4 | 5 | 6 | 7 |
|---|---|---|---|---|---|---|---|
| Composition, percent: | | | | | | | |
| Zeolite | 53 | 56 | 61 | 65 | 66 | 64 | 64 |
| $TiO_2$ | 5.6 | None | None | None | None | 2.1 | 2.1 |
| $MoO_3$ | 8.9 | 11.0 | 9.2 | 5.1 | 4.6 | 4.3 | 4.3 |
| NiO (in sieve) | 2.8 | 3.0 | 0.4 | None | None | None | None |
| Binder, percent: | | | | | | | |
| $SiO_2$ | 27 | 27 | 27 | 27 | 27 | 27 | 27 |
| NiO | 2.7 | 2.7 | 2.7 | 2.9 | 2.6 | 2.5 | 2.7 |
| Activity data: | | | | | | | |
| Residual nitrogen, wt. percent | 0.022 | 0.035 | 0.053 | 0.084 | 0.076 | 0.049 | 0.058 |
| Conversion, vol. percent | 54.4 | 49.0 | 36.3 | 25.5 | 21.9 | 40.5 | 38.6 |
| 120-360° gasoline, vol. percent: | | | | | | | |
| Yield of feed | 35.0 | 31.3 | 24.2 | 16.6 | 12.7 | 27.9 | 24.7 |
| Aromatics | 17 | 17 | 17 | 24 | 16 | 20 | 19 |
| Olefins | 3 | 2 | 5 | 11 | 12 | 4 | 6 |
| Saturates | 80 | 81 | 78 | 65 | 72 | 76 | 64 |
| Selectivity | | | | 65 | 58 | 69 | 75 |

The uniqueness of the promotional effect of titanium is demonstrated by the following examples in which zinc, lanthanum, zirconium and iron were added to molybdena-containing zeolite Y catalysts. Details of the preparation of these catalysts are given in Examples 8-12.

EXAMPLE 8

Ammonium zeolite Y, 104 g. was slurried in 100 ml. water. Eighty-nine ml. of 1.0 M zinc nitrate solution and 89 ml. of 1.0 M ammonium molybdate solution were added concurrently, and with mixing, to the zeolite slurry. During the addition 35.5 ml. of 3 N ammonium hydroxide was added to maintain the pH in the range 6.5-7.0 to facilitate formation of zinc molybdate on the zeolite. The resulting combination was then mixed with 20 ml. of 1.7 M nickel nitrate solution. The mixture was allowed to stand overnight and the nickel-exchanged product was collected by filtration. The filter cake was mixed with 100 ml. "Ludox LS" and 28 ml. 1.7 M nickel nitrate solution. The resulting paste was warmed to thicken to a stiff consistency and then formed into 0.094 x 0.020-inch pellets by spreading on a perforated steel plate. Finally the pellets were dried at 2200 F. and activated by calcining overnight at 9000 F. and presulfiding by saturating with hydrogen sulfide at room temperature.

EXAMPLE 9

Ammonium zeolite Y, 104 g., was slurried in 100 ml. water. Lanthanum chloride, 89 ml. of 1.0 M solution was added concurrently to the slurry. The pH was maintained at 6.0-6.5 during the addition to facilitate the formation of lanthanum molybdate on the zeolite. The resulting combination was mixed with 20 ml. of 1.7 M nickel nitrate solution. Then the mixture was allowed to stand overnight. Next, the nickel-exchanged product was collected by filtration. The filter cake was then mixed with 108 ml. "Ludox LS" 30% silica sol and 30 ml. of 1.7 M nickel nitrate solution. The resulting paste was formed into pellets and activated as in Example 8.

EXAMPLE 10

A slurry was prepared by adding 300 g. ammonium zeolite Y (84% solids) to 1000 ml. water. Zirconyl chloride, 1200 ml. of 0.20 M solution and ammonium molybdate, 200 ml. of 1.0 M solution were added simultaneously to the slurry with the proportions adjusted to keep the pH in the range 3.5-3.8. The resulting combination was collected by filtration and then resuspended in 250 ml. of 0.21 M ammonium heptamolybdate. Sufficient glacial acetic acid was added to this mixture to adjust the pH to 3.8. The resulting molybdic acid slurry was allowed to stand two days before filtering. Next, the filter cake was mixed with 75 ml. of 1.7 M nickel nitrate. The acid reaction of the nickel was counteracted by adding sufficient 3 N ammonium hydroxide to increase the pH to 4.0. Then the solids were collected by filtration. Finally the filter cake was mixed with "Ludox LS" silica sol and nickel nitrate solution in proportions to provide 27.3% $SiO_2$ and 2.7% NiO as a binder. This mixture was warmed on a steam bath and then formed into pellets and activated as in the previous examples.

EXAMPLE 11

Ammonium zeolite Y, 104 g., was slurried in 100 ml. water. Zirconyl chloride, 89 ml. of 1.0 M solution, and ammonium molybdate, 89 ml. of 1.0 M solution, were added concurrently to the zeolite slurry. The pH was maintained in the range 4.0-4.5 by adding 10.4 ml. 3 N $NH_4OH$ while preparing the zirconia-molybdena combination. Next, 20 ml. of 1.7 M nickel nitrate was added and the mixture was allowed to stand overnight. The nickel exchanged product was collected by filtration and the filter cake was mixed with 104 ml. "Ludox LS" and 29 ml. 1.7 M nickel nitrate. The resulting paste was formed into pellets and activated as in the previous examples.

EXAMPLE 12

Ammonium zeolite Y, 104 g., was slurried in 100 ml. water. Eighty-nine ml. of 1.0 M ferric nitrate solution and 89 ml. of 1.0 M ammonium molybdate solution were added concurrently, and with mixing, to the zeolite slurry. During the addition 55.4 ml. of 3 N ammonium hydroxide were added to maintain the pH in the range 5.0-5.5 to facilitate formation of ferric molybdate on the zeolite. The resulting combination was then mixed with 20 ml. 1.7 M nickel nitrate solution. The mixture was allowed to stand overnight and the nickel-exchanged product was collected by filtration. The filter cake was mixed with 100 ml. "Ludox LS" and 28 ml. 1.7 M nickel nitrate, formed into pellets and activated as in the previous examples.

The catalysts of Example 8 to 12 were tested in the same hydrocracking conversion process as that of Examples 1 to 7. Results are given in Table III. Comparing the data for the catalysts of Examples 8 and 9 with that of Example 3, in Table II, shows that zinc and lanthanum actually decreased the activity of the catalyst. The zirconium-promoted catalyst of Example 10 was also less active than the titanium-promoted catalyst of Example 1 (Table II) although the zirconium catalyst contained a greater amount of $MoO_3$ and would, therefore, normally be expected to be more active. Both the zirconium and iron-promoted catalysts of Examples 11 and 12 were substantially less active than the catalyst of Example 1.

TABLE III

| Example | 8 | 9 | 10 | 11 | 12 |
|---|---|---|---|---|---|
| Promoter | ZnO | La$_2$O$_3$ | ZrO$_2$ | ZrO$_2$ | Fe$_2$O$_3$ |
| Composition, percent: | | | | | |
| Zeolite | 56 | 49 | 50 | 54 | 58 |
| Promoter | 4.6 | 13.4 | 4.6 | 6.8 | 3.9 |
| MoO$_3$ | 9.0 | 7.0 | 12.6 | 8.7 | 8.0 |
| NiO | 3.4 | 3.4 | 6.2 | 3.3 | 3.2 |
| SiO$_2$ | 27 | 27 | 27 | 27 | 27 |
| Activity data: | | | | | |
| Residual nitrogen, wt. percent | 0.071 | 0.091 | 0.037 | 0.057 | 0.051 |
| Conversion, vol. percent | 36.8 | 35.1 | 48.9 | 42.3 | 42.3 |
| 120–360° gasoline, vol. percent: | | | | | |
| Yield of feed | 22.6 | 18.4 | 32.0 | 26.9 | 26.9 |
| Aromatics | 18 | 19 | 19 | 18 | 16 |
| Olefins | 7 | 10 | 2 | 4 | 5 |
| Saturates | 75 | 71 | 76 | 78 | 79 |

EXAMPLE 13

This example illustrates the promotional effect of titanium in a zeolite Y catalyst employing palladium as the hydrogenating component. A zeolite Y catalyst containing 0.5% Pd and 7.5% TiO$_2$ was prepared as follows:

Ammonium zeolite Y, 100 g. (74 g. on a calcined basis), was slurried with 200 ml. water. Sufficient hydrochloric acid was added to lower the pH to 3.2; then the slurry was chilled to less than 5° C. to prevent polymerization of titanic acid. Ortho titanic acid was prepared by adding 18.7 ml. of 4.0 M titanium tetrachloride to 1,000 ml. of water prechilled to 5° C. The pH of the titanium solution was raised to 3.2 by slowly adding 286 ml. of prechilled 1.0 N ammonium carbonate solution. A small sample of the titanic acid was withdrawn to determine the rate of polymerization. Then the zeolite slurry was immediately added and stirred for 30 minutes. The separate sample of titanic acid became viscous after 8 minutes and set to a firm gel in 15 minutes. The gel was broken up and washed with a small amount of water by centrifuging. Adding a few drops of hydrochloric acid and hydrogen peroxide to the supernatant liquor gave a dark yellow color which indicated that the gel still contained some soluble titanium. This contrasted with the zeolite slurry which was not gelatinous and tested negative for dissolved titanium. After 30 minutes the zeolite slurry was filtered and washed free of chloride and then exchanged with 120 ml. tetraamine-palladium nitrate solution which contained 3.33 mg. Pd per ml.

The palladium-exchanged product was collected by filtration and the filter cake dried at 200° F. The material was then compression pelleted to form ⅛ x ⅛ inch pellets which were then activated by calcination in air at 860° F.

EXAMPLE 14

A zeolite Y catalyst containing 0.67% Pd was prepared by exchanging a slurry of 100 g. ammonium zeolite Y (the same as that employed in preparation of the catalyst of Example 13) in 200 ml. water with 150 ml. of a solution of tetraaminepalladium nitrate which contained 3.33 mg. Pd per ml. The palladium-exchanged product was filtered and the filter cake dried at 200° F. The material was then compression pelleted to form ⅛ x ⅛ inch pellets which were then activated by calcination in air at 860° F.

The catalysts of Examples 13 and 14 were compared in a hydrocracking test employing a dual bed reactor in which the upper bed was a hydrotreating catalyst consisting of 3.4% NiO and 15.2% MoO$_3$ on alumina and the lower bed was the catalyst of either Example 13 or Example 14. The feed was the gas oil having the characteristics given in Table I. Reaction conditions were as follows: pressure, 1400 p.s.i.g.; LHSV over both the hydrotreating catalyst and the hydrocracking catalyst, 4.0; hydrogen circulation ratio 12,000 s.c.f./bbl. of charge.

Temperature, time on stream and results are given in Table IV. The superiority of the titanium-promoted catalyst in percent conversion and yield of 120–360° F. gasoline is apparent from the data of the table.

TABLE IV

| | Example | |
|---|---|---|
| | 13 | 14 |
| Catalyst | TiO$_2$-Pd-zeolite Y | Pd-zeolite Y |
| Palladium, wt. percent | 0.50 | 0.67 |
| Reaction temperature, ° F | 796 | 801 |
| Hours on stream | 24–33 | 30–39 |
| Product gravity, ° API | 50 | 43 |
| Residual nitrogen | 0.025 | 0.026 |
| Conversion, vol. percent of feed | 53.8 | 45.7 |
| 120–360° gasoline, vol. percent of feed | 31.2 | 25.8 |

I claim:

1. A catalyst comprising a crystalline aluminosilicate zeolite having incorporated therein a promoting amount of titanium or a compound thereof and at least one hydrogenation component selected from the metals, oxides and sulfides of Groups V, VI and VIII of the Periodic Table.

2. The catalyst of claim 1 in which the zeolite is zeolite Y.

3. The catalyst of claim 2 in which the zeolite Y is in the ammonium form.

4. The catalyst of claim 1 in which the titanium is in the form of the elemental metal.

5. The catalyst of claim 1 in which the titanium is in the form of an oxide.

6. The catalyst of claim 1 in which the titanium is in the form of a sulfide.

7. The catalyst of claim 1 in which the hydrogenation component is in the form of the elemental metal.

8. The catalyst of claim 1 in which the hydrogenation component is in the form of an oxide.

9. The catalyst of claim 1 in which the hydrogenation component is in the form of a sulfide.

10. The catalyst of claim 1 in which the hydrogenation component is molybdenum.

11. The catalyst of claim 1 in which the hydrogenation component is palladium.

12. The catalyst of claim 1 in which the hydrogenation component is present in an amount of from about 0.1% to 20% by weight and the titanium is present in an amount of about 0.5% to 15% by weight.

13. The catalyst of claim 1 which additionally contains an oxide or sulfide of cobalt or nickel in an amount sufficient to stabilize the crystalline structure of the zeolite.

14. The catalyst of claim 13 in which the zeolite is ammonium zeolite Y, the titanium is present as titanium dioxide in an amount of about 0.5% to 15% by weight, the hydrogenation component is molybdenum oxide and is present in an amount of about 0.1% to 20% by weight and in which NiO is present in an amount of about 0.5% to 15% by weight.

15. The catalyst of claim 1 in which the zeolite is ammonium zeolite Y, the titanium is present as titanium dioxide in an amount of about 0.5% to 15% by weight and the hydrogenation component is palladium in an amount of water 0.1% to 20% by weight.

16. A process for hydrocracking a hydrocarbon feed comprising contacting the feed with the catalyst of claim 1 in the presence of hydrogen under hydrocracking conditions.

17. A process for hydrocracking a hydrocarbon feed comprising contacting the feed with the catalyst of claim 13 in the presence of hydrogen under hydrocracking conditions.

18. A process for hydrocracking a hydrocarbon feed comprising contacting the feed with the catalyst of claim 14 in the presence of hydrogen under hydrocracking conditions.

19. A process for hydrocracking a hydrocarbon feed comprising contacting the feed with the catalyst of claim 15 in the presence of hydrogen under hydrocracking conditions.

20. The composition of claim 1 prepared by intimately contacting a zeolitic aluminosilicate with an aqueous solution of at least one water soluble thermally decomposable titanium compound and at least one water soluble thermally decomposable compound of at least one metal selected from Groups V, VI and VIII of the Periodic Chart and calcining the thus impregnated aluminosilicate.

21. The composition of claim 20 wherein said titanium compound is a titanium salt of an anion selected from chloride, fluoride, bromide, sulfate oxychloride and oxalate.

22. The composition of claim 20 wherein said titanium compound is titanium tetrachloride and said compound of said metal is at least one of nickel nitrate and ammonium molybdate.

23. The method of hydrotreating hydrocarbon feed which comprises contacting said hydrocarbon under hydrotreating conditions with the composition of claim 1.

24. The method of denitrogenating hydrocarbon feed containing organically bound nitrogen which comprises contacting said hydrocarbon under denitrogenation conditions with the catalyst of claim 14.

25. The method of hydrotreating hydrocarbon feed which comprises contacting said hydrocarbon with the catalyst of claim 20.

26. The method of denitrogenating hydrocarbon feed which comprises contacting said hydrocarbon feed with the catalyst of claim 22.

27. The method of hydrocracking a hydrocarbon feed which comprises contacting said hydrocarbon feed under hydrocracking conditions with the catalyts of claim 20.

References Cited
UNITED STATES PATENTS

| | | | |
|---|---|---|---|
| 2,372,165 | 3/1945 | Arveson | 208—111X |
| 2,983,670 | 5/1961 | Seubold, Jr. | 208—111X |
| 3,210,265 | 10/1965 | Garwood | 208—111 |
| 3,236,761 | 2/1966 | Rabo et al. | 208—111 |
| 3,269,934 | 8/1966 | Hansford | 208—111 |
| 2,925,375 | 2/1960 | Fleck et al. | 208—89 |
| 3,256,178 | 6/1966 | Hass et al. | 208—89 |
| 3,308,054 | 3/1967 | Duir et al. | 208—254X |

DANIEL E. WYMAN, Primary Examiner

C. F. DEES, Assistant Examiner

U.S. Cl. X.R.

208—216, 254; 252—455Z